United States Patent [19]
Zavasnik

[11] 3,979,491
[45] Sept. 7, 1976

[54] PROCESS FOR THE MANUFACTURE OF AN ORIENTED CONTAINER

[75] Inventor: Fred J. Zavasnik, Bolingbrook, Ill.

[73] Assignee: Continental Can Company, Inc., New York, N.Y.

[22] Filed: Nov. 24, 1971

[21] Appl. No.: 201,823

[52] U.S. Cl. ............................ 264/97; 425/DIG. 208; 425/DIG. 209
[51] Int. Cl.² .......................................... B29C 17/07
[58] Field of Search .................. 264/97, 90, 92, 89; 425/DIG. 208, DIG. 209

[56] References Cited
UNITED STATES PATENTS

| | | | |
|---|---|---|---|
| 2,331,687 | 10/1943 | Hobson | 264/97 |
| 2,331,702 | 10/1943 | Kopitke | 264/97 |
| 3,470,282 | 9/1969 | Scalora | 264/97 |

Primary Examiner—Jan H. Silbaugh
Attorney, Agent, or Firm—Paul Shapiro; Joseph E. Kerwin; William A. Dittmann

[57] ABSTRACT

Method for molding plastic articles by forming a parison on a core within an injection mold, cooling the internal and external walls of the parison thus formed by heat transfer through the core and the injection mold, transferring said core to a delay position for permitting redistribution of heat from the interior of the parison to the exposed walls to obtain a more uniform temperature just above the material's glass transition temperature, and subsequently transferring said core to an expansion mold for expanding same, the cooling and heat redistribution permitting a greater degree of orientation of the polymer chains of the formed articles. Preferably, the apparatus for practicing the process includes injection and expansion molds supported in such a relation as to permit a substantial time interval between injection and expansion of the parison.

2 Claims, 3 Drawing Figures

PROCESS FOR THE MANUFACTURE OF AN ORIENTED CONTAINER

BACKGROUND OF THE INVENTION

This invention relates to the field of injection blow molding. More specifically, it relates to a method for obtaining a higher degree of biaxial orientation of articles made by such processes, and may have application in the field of either blow molding or vacuum molding. Prior designs for injection blow molding machines have primarily related to designs in which minimum machine cycle time could be obtained. For example, U.S. Pat. No. 2,853,736 teaches the formation of a parison at a first injection station and immediate transfer thereof to a second station at which they are blown to desired configuration with subsequent ejection of the blown article at a third station. While such apparatus may be sufficient and economical for the manufacture of many articles, they are not believed to result in a high strength, oriented article such as a bottle suitable for containing pressurized liquids or beverages.

Further, U.S. Pat. No. 3,492,387 suggests that a thermoplastic material may be injected into an injection mold; that the slug of thermoplastic material is to be held in the mold for a time period of four seconds to permit cooling, with subsequent expansion of the thermoplastic slug by mechanical means; such procedures intended to result in a more highly oriented hollow article. Finally, U.S. Pat. No. 3,311,684 suggests that a parison may be extruded, with the interior walls of said parison being cooled by a fluid, followed by stretching of the parison in vertical and in radial directions so as to obtain the desired biaxial orientation.

Although U.S. Pat. No. 3,492,387 teaches orientation, it is not believed that the apparatus is best suited for the formation of containers for pressurized liquids or achieves the desired strength. Alternatively, U.S. Pat. No. 3,311,684 involves an extrusion process with its resulting waste, and does not seemingly provide for uniform heat distribution within the parison whereby maximum orientation can be achieved.

SUMMARY OF THE INVENTION

In order to overcome these disadvantages and to produce a container having a high degree of biaxial orientation of the polymeric chains of the thermoplastic material, and to provide a container suitable for holding pressurized liquids, the instant process and apparatus for practicing same first utilizes an injection process in which a thermoplastic material is injected into an injection mold about a core, with subsequent cooling of the internal and external surface walls of the parison thus formed. Inasmuch as such cooling primarily takes place at or near these surfaces, the entire parison is not reduced to a temperature just about its glass transition temperature ($T_G$) such that maximum orientation of the article can be achieved. Accordingly, this invention includes an additional step of transferring the parison to a holding station whereby the heat within the parison interior may be redistributed to achieve a more uniform temperature (just above $T_G$ for the material) throughout a cross-section of the parison wall with subsequent expansion thereof so as to more completely align the polymeric chains. Too, such expansion process also includes the utilization of a mold having substantial heat transfer capabilities whereby the biaxial orientation may be "frozen into" the formed article. Similarly, the apparatus of the instant invention includes a core carrier, and an injection and expansion mold so arranged at station locations that a holding cycle or station exists between the forming step and the expansion step. Such arrangement is capable of permitting the formation of oriented containers at the highest possible production rate.

Accordingly, it is an object of the instant invention to provide a process for manufacturing hollow articles suitable for containing pressurized liquids. Too, it is a further object of the instant invention to provide a process whereby the maximum biaxial orientation of hollow articles may be obtained and to utilize the inherent heat conduction properties of thermoplastic so as to obtain a parison having more uniform temperature throughout its cross-section for this purpose. Finally, apparatus is suggested whereby such orientation may be accomplished without reducing the production rate of the formed containers so as to permit an economical process.

DESCRIPTION OF THE DRAWINGS

The manner in which the objects of the invention are attained will be made clear by a consideration of the following specification and claims when taken in conjunction with the drawings in which:

DETAILED DISCUSSION

As previously indicated, the instant invention includes the injection of a thermoplastic material about a core within an injection mold to form a parison and subsequent heat transfer from the parison's exposed walls to a fluid circulating within a core and the injection mold. Subsequently, the parison is transferred to a holding station whereby heat redistribution within the parison results in a more uniform parison cross-section temperature just above its glass transition temperature. Then, the parison is transferred to an expansion mold whereby a fluid energy is exerted against the interior wall of the parison causing same to expand against the cavity walls to form a completed article. Too, by controlling the temperature within the expansion mold, the orientation of the polymer chain is "locked in".

The instant process will enhance the orientation of the polymeric chains of most thermoplastic resins used for injection mold applications. However, preferred resins are those of thermoplastic polymers having a high nitrile monomer content in the order of 60% or more such as the copolymers of olefinically unsaturated nitriles such as acrylonitrile, methacrylonitrile and ethylenically unsaturated comonomers such as alkyl acrylates, styrene and graft copolymers of the nitrile copolymers with diene rubbers.

Figure 1:
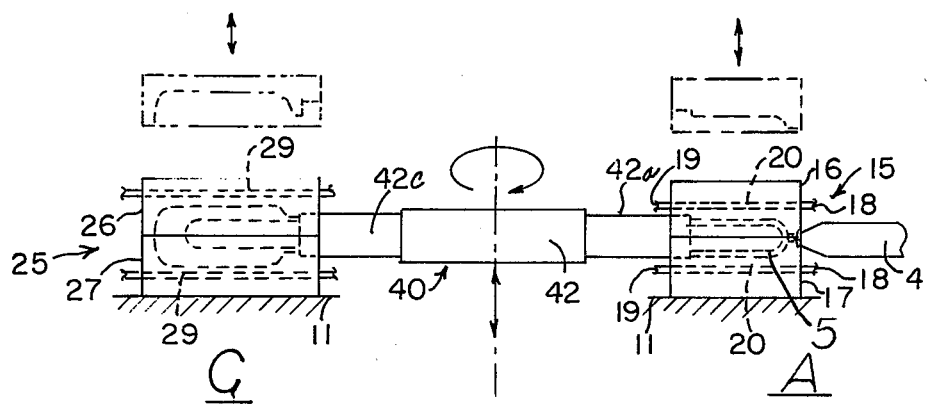
FIG. 1 is a side elevational view of the apparatus which may be utilized in practicing the instant process.
Figure 2:
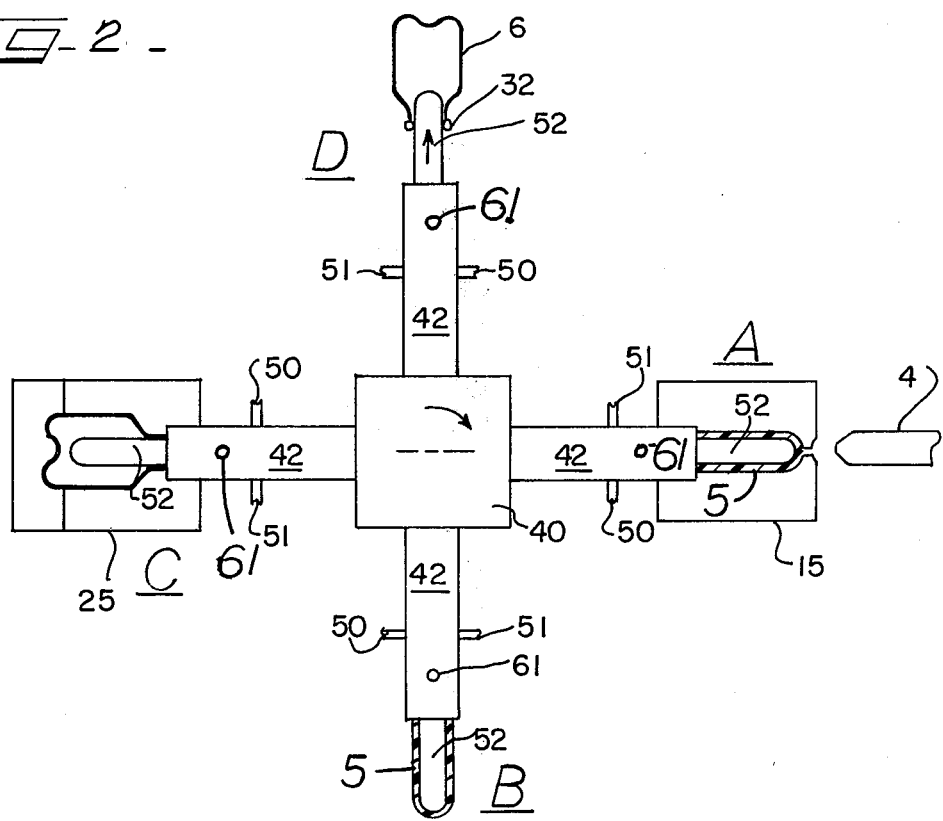
FIG. 2 is a top view of a turntable which is utilized to carry the cores on which the parison are formed.

The process is generally indicated in FIGS. 1 and 2 which depict a parison 5 being injected through nozzle 4 of an extruder (not shown) into an injection mold 15 about a core 52 at station A. Preferably, four such cores 52 are carried by turntable 40 by radially extending arms 42 at 90 degree intervals. After the parison 5 is formed in the injection mold, it is held in such position for approximately 4 or 5 seconds to permit cooling of the material adjacent external and internal walls 7 and 8 (see FIG. 3), after which time the turntable 40 is rotated 90 degrees to a cooling station B. At this station, heat transfer from the interior 9 of the parison to the surface walls 7 and 8 may be effected. After the temperature throughout a cross-section of the parison wall is permitted to become more uniform, the turntable 40 will again be rotated another 90 degrees to station C in juxtaposition with the expansion mold 25. This mold is then closed, with air being emitted through the core 52 to expand the parison against the cavity walls thereof which are cooled by the passage of fluid therethrough so as to lock in the orientation. The core is then indexed on the turntable 40 another 90 degrees to an ejection station D at which point, ejection means 32 will strip the formed article from the core.

FIG. 1 indicates appropriate movement of the turntable. This side elevational view depicts the turntable 40 as being supported for both vertical and rotational movement, and appropriate motors for accomplishing such movement are well known in the art. Specifically, U.S. Pat. No. 3,100,913 which issued to De Matteo on Aug. 20, 1963 depicts one such arrangement. The lower mold halves 17 and 27 of the injection mold and the blow mold are carried by a support 11, while the upper mold halves 16 and 26 are moved vertically as indicated by hydraulic motors (not shown). Prior to indexing the table 40 by an appropriate motor (not shown) the upper mold halves 16 and 26 must be moved to the dotted line position, while the turntable is elevated slightly by a motor (not shown) so as to permit the parison 5 in the injection mold 15 and the formed article 6 in the expansion mold 25 to clear the lower mold halves at which time, rotation is effected.

Thus in operation, the molds 15 and 25 are initially open, and the turntable 40 is rotated so as to align two of the cores 52 in juxtaposition with the molds 15 and 25. Simultaneously, the turntable 40 and the upper mold halves 16 and 26 are lowered with two of the cores 52 resting in the lower mold halves with the upper mold halves closing over them. Accordingly, injection and expansion will take place in these two molds 15 and 25 while cooling of another parison and ejection of a formed article occurs at the other cores 52. Subsequently, the upper mold halves are opened with the turntable rising sufficiently to clear the lower mold halves and indexing again is effected.

Thus, in considering FIGS. 1 and 2 together, it should be apparent that the turntable 40 will successively rotate each of the cores 52 to the injection mold 15, the holding station B, the blow mold 25, and the bottle ejection station D. Too, it should also be apparent that the time lapse which occurs at the cooling station is substantially equal to the time for closing the molds 15, injecting a thermoplastic material into same, the cooling time permitted in the injection mold and the time required for rotation. By providing such additional cooling period at station B, redistribution of heat within the parison walls will be affected as more fully described hereinafter.

In order to maximize the production rate of formed articles, rapid and uniform cooling of the parison is desired. Accordingly, substantial cooling of the interior and exterior walls 7 and 8 of the parison 5 is obtained within the injection mold, with the uniformity occurring as a result of heat redistribution at the cooling station B.

As shown in FIG. 1, the exterior wall 7 of the parison may be cooled through the utilization of cooling passages 20 within the injection mold, which are well known in the art. Thus, fluid may be directed through conduits 18, passages 20 and exhausted from the opposite end of the injection mold by conduits 19.

Figure 3:
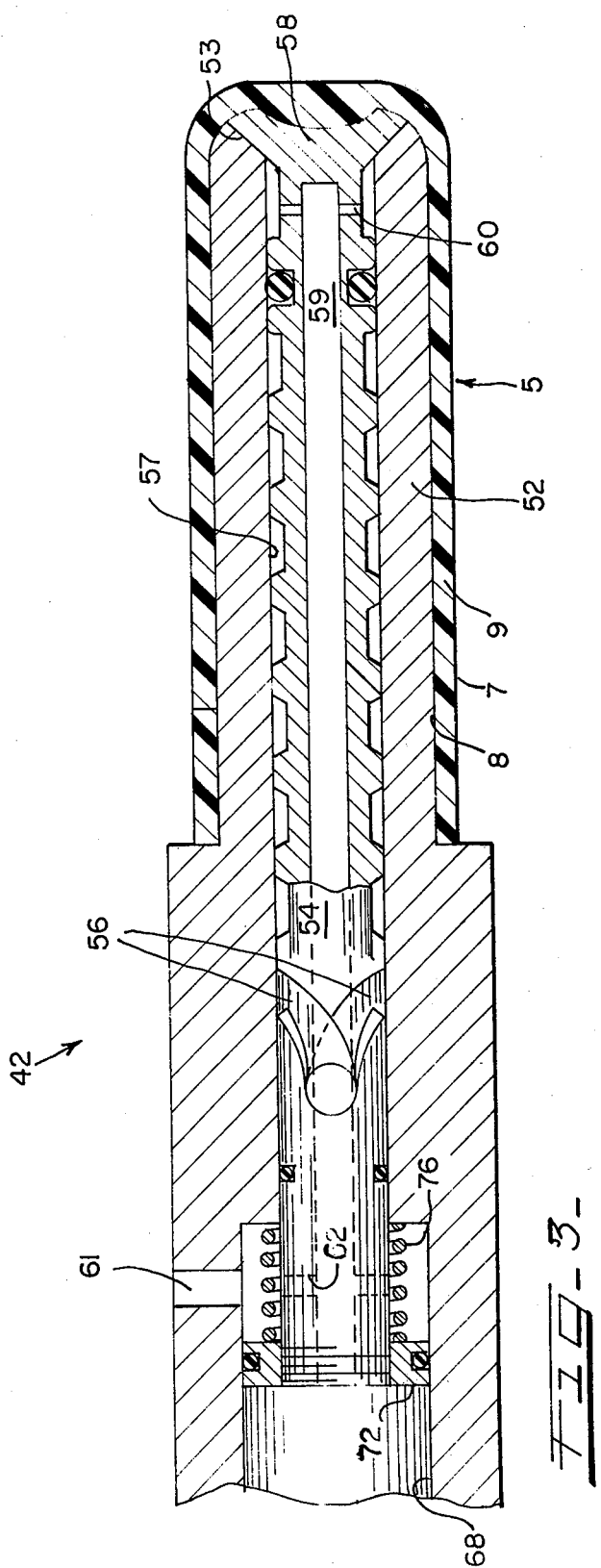
FIG. 3 is an elevational view partially in section of a core utilized in practicing the instant invention.

FIG. 3 depicts structure for the cores 52 which may be utilized to cool the interior wall 8 of the parison. The radial arm 42 mounted on turntable 40 carries the cylindrical core 52 as shown. Extending through the arm 42 and the core 52 is a bore 57 which carries a control rod 54. As depicted, the control rod is a cylindrical member having at its forward end a conical end section 58 which sealingly engages a conical counter bore 53 on the end of the core 52. Within the arm 42 is a counter bore 68, into which the control rod 54 extends and is threadedly engaged with an annular sealing member 72. A spring 76 interposed between the sealing member 72 and the end of the counter bore 68 urges the control rod 54 to the rear or left as viewed in the drawing.

As previously indicated, heat is to by transferred from the interior wall 8 of the parison, through the core 52 by the utilization of fluid passages. Such fluid passages may take the form of double threads 56 located 180 degrees apart on the exterior wall of the control rod 54. Accordingly, fluid may be entered through a bore 51 in the arm 42 and travel through one of the threaded grooves to the forward end of the control member and return through the opposite groove and out an aperture 50 on the opposite side thereof. Appropriate seals as shown on the opposite ends of the control rod may be used to effectively preclude the leakage of fluid from the core.

In order to cause expansion of a parison previously formed on the core 52 within the blow mold, a bore 59 is formed within the control rod 54. At the forward end of the control rod is a cross drill 60 which permits air flowing into the bore 59 to pass between the surfaces formed by the end section 58 and conical bore 53 when the control member is urged forward. Such air is admitted to the bore via an aperture 61 in arm 42 and cross drill 62 within control member 54. As is well known in the art, camming means may be utilized to urge the control member 54 forward at the appropriate time so as to emit air to the interior of the parison and expand same against the walls of the expansion mold.

MODE OF OPERATION

Assuming that a core 52 has been rotated in juxaposition the injection mold 15 with this mold being subsequently closed, a thermoplastic material may be injected into the mold about the core through the nozzle 4. The time period for injection and the holding of pressure within the injection mold may take 3 of 4 seconds. Subsequently, the nozzle 4 is retracted in the conventional manner and the surfaces 7 and 8 of the parison are then cooled for several additional seconds. Ideally, it is contemplated that the surface of the core 52 should be maintained at the glass transition with the injection mold being maintained at a lower temperature through heat transfer to fluid passing through the core 5 and the injection mold 15. Thus, during the delay period within the injection mold, the interior 7 and exterior 8 walls of the parison and the thermoplastic adjacent thereto are rapidly cooled to or below an orientation temperature. (Due to the high thermal conductivity of the metal core and the injection mold, the surfaces 7 and 8 are believed to achieve substantially the same temperature as those metal components.)

With respect to the cooled surface walls, the interior 9 may be regarded as a heat reservoir.

Subsequently, the upper mold half is opened, the turntable 40 raised and rotated as previously indicated so as to move the cores 52 and formed parison 5 to a holding station B. At this holding station, heat will continue to flow from the interior wall 8 of the parison through the core 52 and the thermoplastic material in this region will be reduced to a point just above its glass transition temperature. Simultaneously, however, heat will flow from the interior 9 of the parison outwardly so as to reheat the exterior wall 7 of the parison to a point just above its glass transition temperature. Accordingly, this heat transfer process results in a more uniform temperature of the cross-section of the parison wall in a minimum amount of time. From the holding station B, the parison is indexed to the blow mold for expansion, such being affected by the delivery of air through the bore 61 of the arm 42, into the cross drill 62, bore 59, cross drill 60 and out of the end of the core the forward movement of the control rod being affected by cams (not shown) so as to open the seal effected between the surfaces of the counter bore 53 and the conical end 58 of the control member. Simultaneously with such expansion, the expanded article will be cooled by fluids passing through passages 29 within the expansion mold 45 so as to freeze or lock in the orientation of the polymer chains. Subsequent opening of the mold 45 and rotation of the turntable will move the formed article on its core to an ejection station at which point the bottle or container may be removed.

As contemplated, it is anticipated that during each of the four cycles, or one complete revolution of the turntable, four complete articles will be made. As viewed in FIG. 1, it is also anticipated that several molds may be vertically stacked one upon the other, or they may be placed side by side so as to increase the maximum rate of production.

EXAMPLE

Containers fabricated from Barex 210 a commercially available amorphous thermoplastic nitrile resin consisting of acrylonitrile/methylacrylate-acrylonitrile/butydiene graft copolymer containing about 69% acrylonitrile, 22% methylacrylate, and 9% butadiene rubber were formed through the process herein identified. This resin has a glass transition temperature of approximately 180°F, and was injected into an expansion mold of the type illustrated in FIG. 1 in a plasticized state, at a temperature of approximately 390°F. The fluid passing through the injection mold 15 was maintained at a temperature of 120°F while a coolant within the blow stick 52 was maintained at approximately 200°F, approximately 20°F above the glass transition temperature of Barex 210. The extruder device injected and held a pressure within the injection mold 15 for a period of 3 seconds, while cooling of the parison against the surfaces of the core and the injection mold continued for an additional 4 seconds. The core was then transferred to a holding station, with a total delay time (including time for movement of the core and time at station B) of twelve seconds before actual blowing of the container within a blow mold having a coolant passing therethrough at a temperature of 52°F.

The test bottles (at a weight of approximately 33.7 grams and having a volumetric capacity of approximately 317 cc) were then filled with a commercial carbonated soft drink, charged, with $CO_2$ to a pressure of 75 PSI absolute at 72°F and then stored at 100°F and 80% relative humidity for two weeks.

The volume expansion or creep of the test bottles was then determined by placing the bottles in a container of water with a fixed filling level. The volume of water displaced by the test bottles at the end of the period in excess of that displaced at the beginning of the period is a measure of the volume expansion which occured during the two weeks' storage time. It was determined by this creep test that the average volume expansion of the bottles made as indicated in this example 9.01% of the original volume.

Accordingly, applicant is proffered herein an apparatus and a process for obtaining a thermoplastic container having a high resistance to creep and deformation under pressure. In the above example, the interior wall of the parison was directly cooled to a point just above its glass transition temperature while the exterior wall is cooled below the point and subsequently reheated by heat transfer. However, both surfaces might be reduced below the glass transition temperature and subsequently reheated during the "cooling" or delay cycle and such general procedure represents a most economical and rapid manner by which a thermoplastic material may be reduced from its injection temperature to a more uniform orientation temperature. It is preferred that this more uniform temperature at which expansion occurs be within a 50°F range above $T_G$.

I claim:

1. A process for making a hollow article of thermoplastic material which comprises
   a. injecting a thermoplastic material having a nitrile monomer content of at least 60% into an injection mold about a core to form a parison;
   b. cooling the interior wall of the parison to a temperature just above its glass transition temperature and the exterior wall to a temperature below the glass transition temperature;
   c. permitting the exterior wall to reheat to a temperature above the glass transition temperature by heat transfer from the interior of the parison; and
   d. expanding the parison into a hollow article.

2. A process as recited in claim 1 in which the expanding step includes cooling of the hollow article.

* * * * *